United States Patent

[11] 3,547,459

| [72] | Inventor | Sidney D. Lapham<br>Walnut Creek, Calif. |
|---|---|---|
| [21] | Appl. No. | 738,669 |
| [22] | Filed | June 20, 1968 |
| [45] | Patented | Dec. 15, 1970 |
| [73] | Assignee | Roll-Rite Corporation<br>Oakland, Calif.<br>a corporation of California |

[54] HIGH CAPACITY CASTER
10 Claims, 5 Drawing Figs.

[52] U.S. Cl........................................ 280/79.2,
16/20, 16/48
[51] Int. Cl........................................ B62b
1/100, B60b 33/00
[50] Field of Search........................................ 16/20, 30,
31, 29, 48, 47; 280/80, 81, 490, 239, 79.1, 79.2

[56] References Cited
UNITED STATES PATENTS

| 349,368 | 9/1886 | Saxton.......................... | 16/29 |
| 698,963 | 4/1902 | Kennedy...................... | 16/47 |
| 681,123 | 8/1901 | Kennedy...................... | 16/47 |
| 3,433,500 | | Christensen.................. | 16/47 |

Primary Examiner—Bobby R. Gay
Assistant Examiner—Doris L. Troutman
Attorney—Mellin, Moore & Weissenberger ABSTRACT: The load-bearing capacity of a caster is greatly increased by providing the caster with a bending moment absorbing outrigger arrangement which carries at its end a secondary caster mounted for swiveling movement with respect to the outrigger and hence with respect to the primary caster assembly.

PATENTED DEC 15 1970
3,547,459
SHEET 1 OF 2
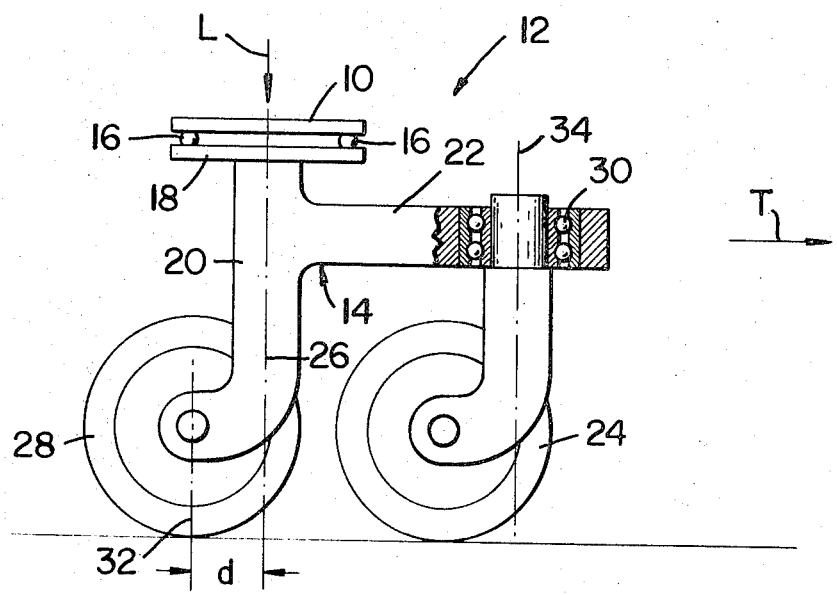
FIG_1
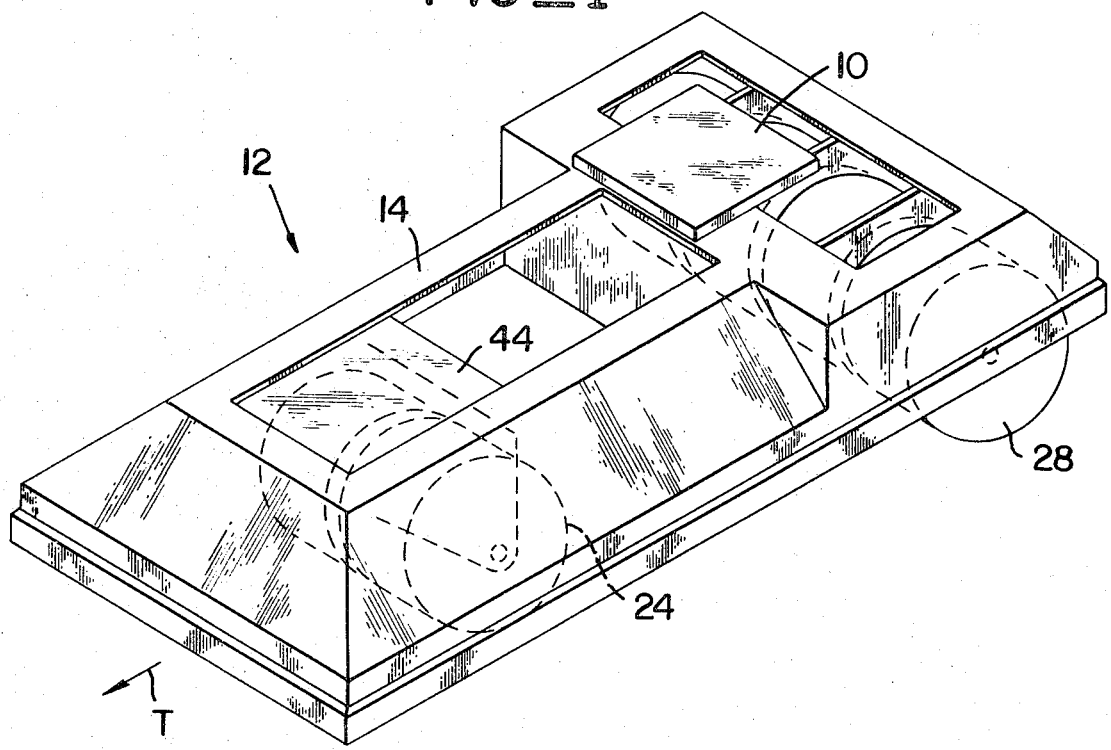
FIG_2
INVENTOR.
SIDNEY D. LAPHAM
BY
Mellin, Moore & Weissenberger
ATTORNEYS

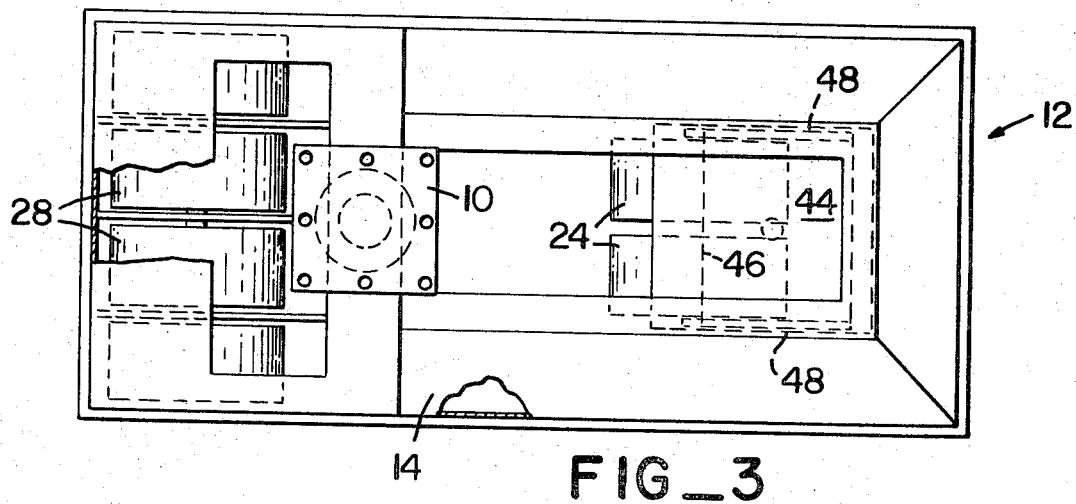
FIG_3
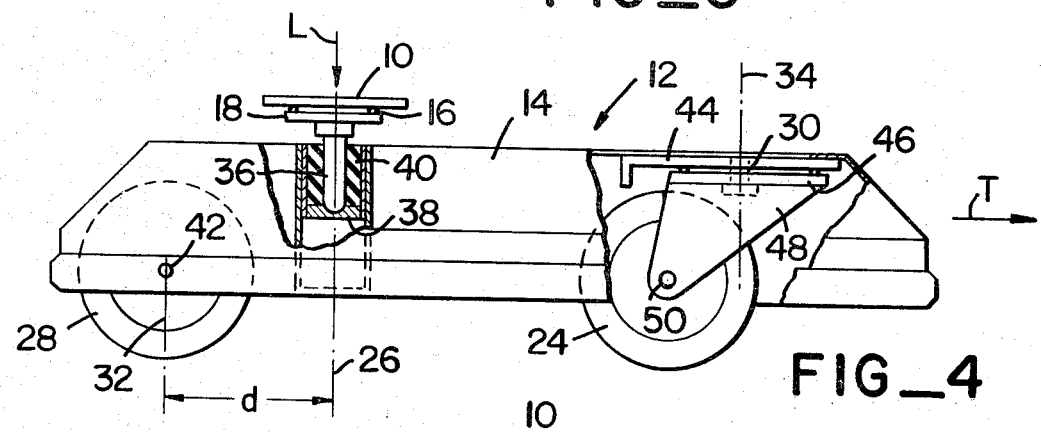
FIG_4
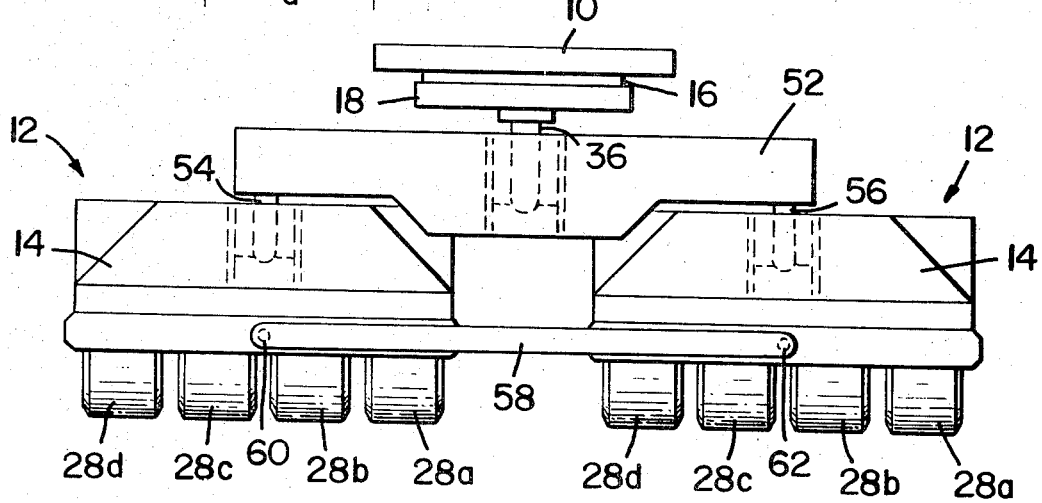
FIG_5
INVENTOR.
SIDNEY D. LAPHAM
BY
Meelin, Moore + Weissenberger
ATTORNEY 3,547,459

HIGH CAPACITY CASTER

BACKGROUND OF THE INVENTION

This invention relates to heavy duty industrial casters, and, more particularly, to a compound caster in which the bending moment on the primary caster wheels is offset by a secondary caster arrangement positioned on the opposite side of, and more remote from, the load axis than the axis of the primary caster wheels.

Swiveling casters inherently have an offset between the load axis, i.e., the vertical axis about which the caster swivels, and the horizontal axis about which the caster wheel rolls. The greater this offset in relation to the diameter of the wheel, the easier the caster is to swivel; but on the other hand, this offset creates a bending moment at the swivel mounting, and consequently, the greater the offset, the more the swivel mounting and the superstructure have to be able to absorb this moment. While this problem is not too acute on light casters, it assumes considerable importance on heavy industrial casters.

SUMMARY OF THE INVENTION

Normally, the offset on a single swiveling caster is on the order of 50 percent of the caster diameter. In order to increase this percentage and at the same time eliminate the bending moment at the swivel mounting, the present invention proposes an outrigger construction in which the wheel bracket is arranged so as to support main load-bearing wheels in fixed relation to the wheel bracket in a position relatively close to the swivel axis, and auxiliary wheels swivelable with respect to the wheel bracket at a position more remote from, and on the opposite side of, the load axis of the caster.

By virtue of this arrangement, the vertical load applied along the load axis is supported principally by the primary or trailing wheels and to a lesser degree by the secondary or lead wheels.

It is preferable to so proportion the dimensions of the caster that the lead wheels bear somewhat less than their proportionate share of the total load, as this enables them to swivel more easily with respect to the caster frame. There is an optimum relationship between the total load imposed upon the trailing wheels and the total load imposed upon the lead wheels, this ratio being approximately 2:1. Increasing this ratio results in a caster which has too much of a lever arm and is too slow in its action. Reducing this ratio requires an excessive swiveling force because it imposes too much load on the swiveling lead wheel.

BRIEF DESCRIPTION OF THE DRAWINGS

FIG. 1 is a schematic representation of the mechanical concept underlying the present invention;

FIG. 2 is a perspective view of a preferred embodiment of the invention;

FIG. 3 is a plan view, partly cut away, of the embodiment of FIG. 2;

FIG. 4 is a side elevation, partly broken away and partly in section of the embodiment of FIG. 2; and FIG. 5 is another embodiment of the invention adapted for the carrying of greater loads.

DESCRIPTION OF THE PREFERRED EMBODIMENTS

FIG. 1 shows a schematic view of the principle underlying the caster of this invention. In FIG. 1, a load L is shown applied to the platform 10 of a caster 12. The frame 14 of the caster 12 is mounted for swivel movement with respect to the platform 10 by means of ball bearings 16 interposed between the platform 10 and the plate 18 fixedly attached to the frame 14.

The frame 14 of the caster 12 is composed of a primary frame member 20 and an outrigger 22. Assuming the direction of travel of the load L to be in the direction of the arrow T, the caster 12 would be an ordinary caster in the absence of the outrigger 22 and the secondary wheel 24. In such an ordinary caster, the load L, which is applied along the axis 26, is offset by the distance $d$ from the (horizontal) axis of the primary caster wheel 28. This offset $d$ is of course necessary so that the primary caster wheel 28 will swivel, together with its frame, about the axis 26, so as to position itself in a trailing position with respect to the load travel direction T.

The greater the distance $d$, the easier it is for the primary caster wheel 28 to swivel around. On the other hand, the offset $d$ also causes a bending moment in the caster frame which has to be absorbed by a sufficiently sturdy construction of the caster assembly and the means (not shown) which secure the load to the platform 10. The greater the distance $d$, the greater this moment becomes. Even in an ordinary caster built for relatively low loads, the offset $d$ is usually kept on the order of 50 percent or less of the diameter of the primary caster wheel 28. As the load to be handled by the caster increases, the conflicting requirements of a large offset for easier swiveling and of a small offset for bending moment reduction become so incompatible that an upperlimit of practicality for ordinary caster assemblies is reached.

To circumvent this impasse, the present invention provides the frame 14 with an outrigger 22 in which a secondary caster wheel 24 is swivel-mounted by an appropriate thrust bearing 30. By this arrangement, the load L is supported, as far as the frame 14 is concerned, at axes 32 and 34. Since the frame 14 is thus supported at two points on opposite sides of the load axis 26, the bending moment in the frame 14 is greatly reduced, and more importantly, is not transmitted at all to the platform 10, the plate 18 and the bearing 16.

The removal of the bending moment from the last-mentioned critical portions of the assembly, and the reduction of the bending moment in the rest of the frame, now makes it practical to increase the distance $d$ to considerably more than 50 percent of the diameter of primary wheel 28. For example, it will be noted in FIG. 4 that in the preferred embodiment, the distance $d$ is on the order of 100 percent of the diameter of the primary wheel 28.

With the compound swiveling arrangement thus provided, the caster 12 will swivel about the axis 26 in such a manner as to place the primary wheel 28 into a trailing position. During this swiveling movement of the frame 14 about axis 26, the secondary or lead wheel 24 swivels about axis 34 to follow the rotational movement of frame 14 about axis 26. When the rotational movement of frame 14 has been completed and the primary wheel 28 is in trailing position, the secondary wheel 24 again swivels about axis 34 to assume a trailing position with respect to that axis, i.e., to position itself parallel to the primary wheel 28. It will be noted that throughout this whole process, the load distribution between the two wheels remains equal because the distance $d$ and the distance between axes 26 and 34 both remain constant.

FIGS. 2 through 4 show a preferred embodiment of the principle explained above in connection with FIG. 1. In this embodiment, the platform 10 is swivel-mounted by an appropriate bearing 16 on the plate 18. In this embodiment, however, the plate 18 is not directly attached to the frame 14. Instead, the plate 18 is affixed to a pin 36 which is supported in a concave depression of a plate 38 fixedly attached to the frame 14, and whose sides are resiliently supported against lateral movement by a rubber insert 40. In this way, the rubber, whose function it is to stabilize the fulcrum, is not compressed by the load but only by its primary function in compensating for unevenness of the ground. The purpose of this arrangement is to permit the load platform, bearing and pin assembly to resiliently pivot to a limited degree about the lower rounded end of pin 36 to hold the load platform 10 level in spite of any unevenness of the floor over which the caster 12 is rolled. The rubber insert 40 is preferably vulcanized onto the sides of the pin 36 and the sides of its container so as to prevent any pivotal movement of pin 36 about the load axis 26.

The frame 14 has a set of primary wheels 28a through 28d mounted thereon for rotation about an axle 42 fixed with respect to the frame 14. At the leading end (right end in FIGS. 3 and 4, left end in FIG. 2) the frame 14 has a bearing plate 44 in which a swivel plate 46 is pivotally supported by a thrust bearing 30. Bracket plates 48 depending from the swivel plate 46 carry the secondary wheel axis 50 on which a pair of secondary wheels 24a and 24b are mounted.

It will be noted that there are four primary wheels 28 and two secondary wheels 24. The reason for this is that the total load carried by the secondary wheels 24 is preferably approximately half of the total load carried by the primary wheels 28, as previously explained herein. This is achieved, of course, simply by making the distance between axes 26 and 34 approximately twice the distance d.

FIG. 5 shows an alternative embodiment of the invention adapted to carry considerably greater loads. As will be apparent from FIG. 5, several of the caster assemblies shown in FIGS. 2 through 4 may be used in side-by-side tandem relationship for even greater load capacity. In thus combining several of the caster assemblies 12, only one swivel bearing 16 is used between the load platform 10 and the plate 18. To compensate for an overall unevenness of the ground, the pin 36 associated with plate 18 is engaged in a resilient mounting (indicated in dotted lines in FIG. 5) similar to that shown in FIG. 4. This resilient mounting is attached to a subframe 52 which in turn is mounted on pins 54, 56 in resilient mountings (dotted lines) in each of the caster assemblies 12. The subframe 52 thus cannot swivel with respect to either of the caster assemblies 12, but can pivot with respect to them so as to compensate for different unevenness of the two ground areas over which the two caster assemblies 12 are rolling. At the same time, the load platform 10 can be kept level in spite of any tilting movement of the subframe 52. To prevent the two caster assemblies 12 from imposing a swiveling movement on the pins 54, 56, the caster assemblies 12 are linked together by links 58 attached to their leading and trailing ends. The links 58 allow pivotal movement of the caster assemblies 12 about axes 60, 62, but otherwise hold them in rigid alignment.

As a matter of example, and taking into account the fact that the total load capacity of a multiwheel assembly is always somewhat less than the sum of the load capacities of its individual wheels, an assembly such as shown in FIG. 5, using 15 ½ inch by 7 inch bull wheels rated at 5,000 pounds each becomes capable of carrying 40,000 pounds, a load rating not nearly practically attainable with conventional caster structures of any manageable size.

It will be seen that the teachings of the above-described invention can be carried out in many ways of which the embodiments shown are merely illustrative. Consequently, I do not desire to be limited by the embodiments shown and described herein, but only by the scope of the following claims.

I claim:

1. A caster assembly comprising:
   a. a load-receiving member;
   b. frame means supporting said load-receiving member and mounted for swiveling movement with respect thereto about a first generally vertical axis;
   c. primary wheel means mounted on said frame means and rotatable with respect thereto only about a first generally horizontal axis spaced in a first direction from said first vertical axis; and
   d. secondary wheel means mounted on said frame means for swiveling movement about a second generally vertical axis and for rotation about a second generally horizontal axis spaced from said second vertical axis;
   e. said second vertical axis being spaced from said first vertical axis in a direction generally opposite said first direction.

2. The device of claim 1, in which the spacing between said first horizontal axis and said first vertical axis is substantially less than the spacing between said first and second vertical axes.

3. The device of claim 2, in which the ratio of the first-mentioned said spacing to the second-mentioned said spacing is on the order of 1:2.

4. The device of claim 1, in which said primary wheel means include a plurality of wheels.

5. The device of claim 1, in which said primary and secondary wheel means each include a plurality of wheels.

6. The device of claim 1, further comprising means interposed between said frame means and said load-receiving member arranged to rigidly support the vertical component of a load applied to said load-receiving member but to allow limited resilient omnidirectional pivotal movement of said frame means with respect to said load-receiving member in a horizontal plane.

7. A caster comprising:
   a. a load-receiving member;
   b. subframe means supporting said load-receiving member for swiveling movement with respect thereto; and
   c. a plurality of caster assemblies supporting said subframe means, each of said caster assemblies including:
      1. frame means supporting said subframe means along a generally vertical first axis;
      2. primary wheel means mounted on said frame means and rotatable with respect thereto only about a first generally horizontal axis spaced in a first direction from said first vertical axis; and
      3. secondary wheel means mounted on said frame means for swiveling movement about a second generally vertical axis and for rotation about a second generally horizontal axis spaced from said second vertical axis;
      4. said second vertical axis being spaced from said first vertical axis in a direction generally opposite said first direction.

8. A caster according to claim 7, in which said subframe means are mounted for limited resilient omnidirectional pivotal movement in a horizontal plane with respect to said load-receiving member.

9. A caster according to claim 8, in which said caster assemblies are mounted for limited resilient omnidirectional pivotal movement in a horizontal plane with respect to said subframe means but are not swivelable with respect thereto.

10. A caster according to claim 9, further comprising linkage means connecting said caster assemblies, said linkage means being so connected to said caster assemblies as to allow individual pivotal movement of each caster assembly with respect to said subframe means but prevent individual swiveling movement of said caster assemblies with respect to said subframe means.